(12) United States Patent
Nünlist et al.

(10) Patent No.: US 6,938,742 B2
(45) Date of Patent: Sep. 6, 2005

(54) CONDUCTOR RAIL FISH-PLATE

(75) Inventors: Felix Nünlist, Herrenschwanden (CH); Beat Furrer, Bern (CH)

(73) Assignee: Furrer & Frey AG, Bern (CH)

( * ) Notice: Subject to any disclaimer, the term of this patent is extended or adjusted under 35 U.S.C. 154(b) by 0 days.

(21) Appl. No.: 10/481,077

(22) PCT Filed: Jun. 18, 2001

(86) PCT No.: PCT/EP01/06857
§ 371 (c)(1),
(2), (4) Date: Apr. 12, 2004

(87) PCT Pub. No.: WO02/102617
PCT Pub. Date: Dec. 27, 2002

(65) Prior Publication Data
US 2004/0168873 A1 Sep. 2, 2004

(51) Int. Cl.$^7$ ................................................ B60M 1/00
(52) U.S. Cl. .................................................... 191/44.1
(58) Field of Search ................................ 191/22 R, 25, 191/23 A, 29 R, 30, 31, 44.1, 33 R, 44; 238/14.7, 14.1, 14.11, 14.12, 14.4, 14.5, 14.6, 14.13, 14.14; 403/300, 312

(56) References Cited

U.S. PATENT DOCUMENTS

| 1,042,483 | A | * | 10/1912 | Rush | ......................... 238/14.6 |
| 1,922,105 | A | * | 8/1933 | Martin | ....................... 238/14.6 |
| 3,303,293 | A | * | 2/1967 | Howell, Jr. | ................ 191/23 A |
| 3,475,567 | A | * | 10/1969 | Hollander | .................. 191/22 R |
| 3,985,211 | A | | 10/1976 | Bommart | |
| 4,016,961 | A | * | 4/1977 | Howell, Jr. | ................ 191/23 A |

FOREIGN PATENT DOCUMENTS

| JP | 10-181390 | 7/1998 |
| JP | 11-198688 | 7/1999 |

OTHER PUBLICATIONS

XP-002189945, RU 2 073 764 C (Kasylkasov), Feb. 20, 1997, Database WPI Section PQ, Week 97, Class Q14, AN 97-423483, Derwent Publication, Ltd., London, Great Britain.

* cited by examiner

Primary Examiner—Mark T. Le
(74) Attorney, Agent, or Firm—Senniger Powers

(57) ABSTRACT

A conductor rail fishplate for the electrical and mechanical connection of successive conductor rails has two symmetrical plates, which encompass the exterior of the conductor rail. The two plates are tensioned against one another using screws. Contact strips are arranged in the contact zone between the conductor rail and the respective plates, the strips coming into contact with the respective surfaces by means of a large number of spring-loaded contacts.

12 Claims, 3 Drawing Sheets

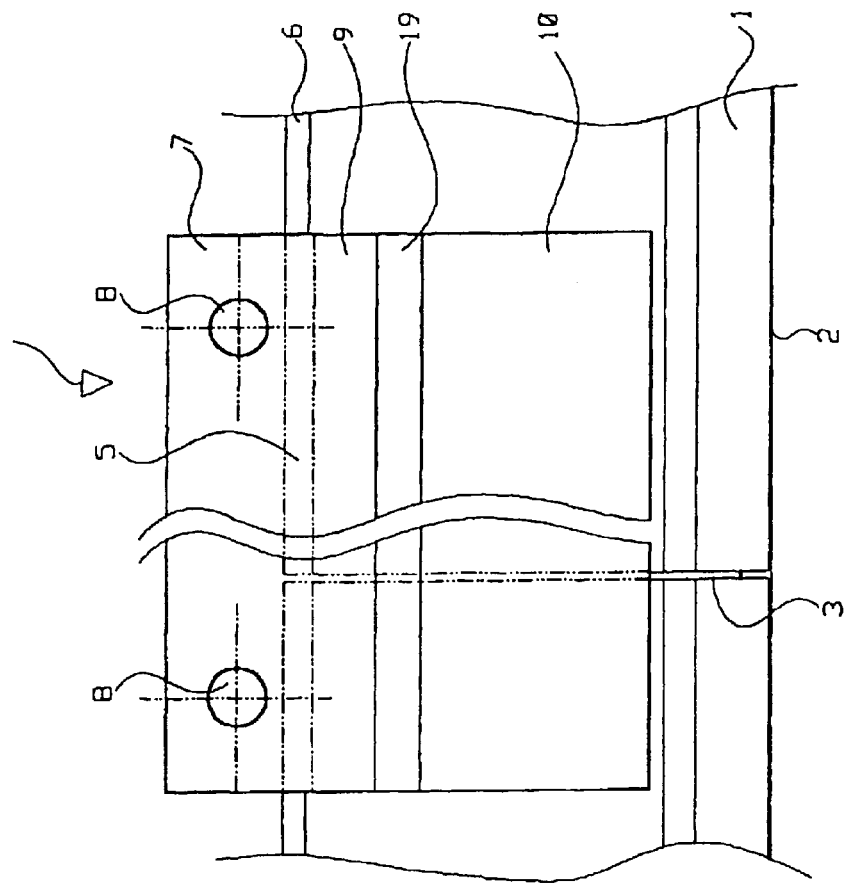
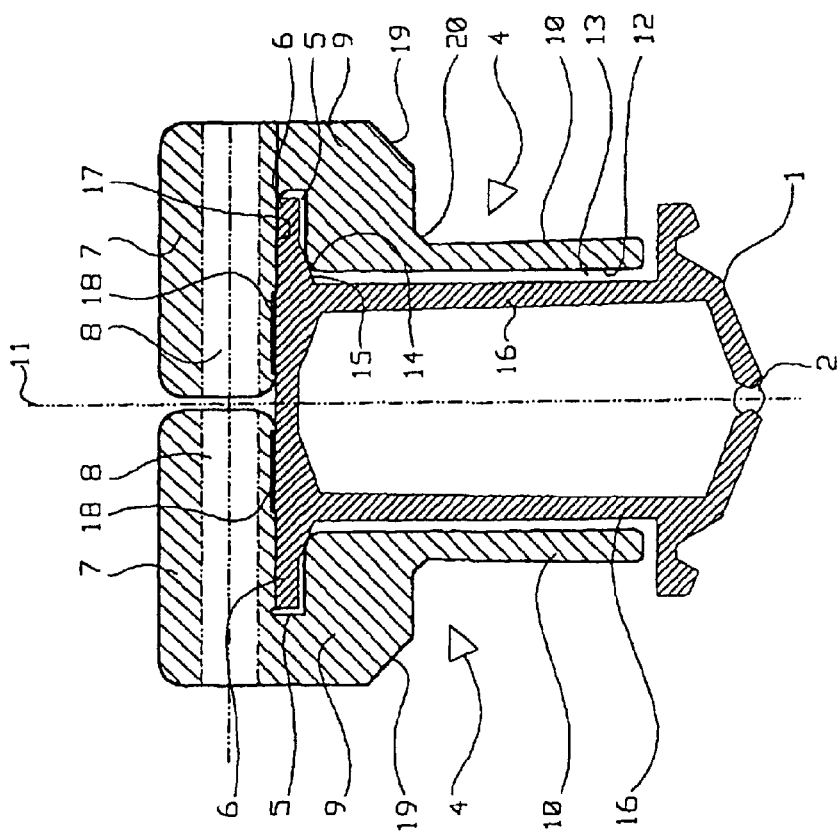
Fig. 1
Fig. 2

CONDUCTOR RAIL FISH-PLATE

BACKGROUND OF THE INVENTION

This invention relates generally to a conductor rail fishplate.

Increasing demands on overhead contact line systems in terms of safety, reliability, current carrying capacity, short-circuit resistance, and minimal installation height have led to the use of conductor rails holding a contact wire that does not carry a tensile load. Fields of application are tunnels and maintenance workshops for electric motor vehicles since work-hindering contact lines can be swung to the side.

Conductor rails are usually molded in lengths of about 12 meters. Conductor rail systems are assembled from successive conductor rails, which must be connected mechanically and electrically. On one hand, the connection requires mechanical strength, maintenance of positive fit, and also transmission capacity for electrical current, which can reach up to 5000 A in current spikes. The positive fit demands that under the load of its own weight, no bends will occur at the joint of two successive conductor rails.

Deformation-free joints of two conductor rail were previously achieved using two plates at the inside of the crosspieces of the conductor rail. These fishplates must be inserted into the hollow spaces of the conductor rails. Then they are pushed against the crosspieces from the outside with screws. The mechanical and positive-fit strength is achieved through wedge-shaped edges on the fishplates and counter shapes in the interiors of the crosspieces. The electrical transmission of current is realized through linear contact between the fishplates and the crosspieces inside of the profile. The linear contacts are achieved through pressure from the tightening of the screws.

A disadvantage for this known conductor rail joint is that two plates must be inserted, holes must be bored in the crosspiece and the plates, and a corresponding number of screws must be tightened. In practice, 16 holes or even threaded holes are bored in each plate and the threads cut. The known conductor rail joint is thus not assembly-friendly. It is also not practical when a conductor rail section must be replaced, because access to the hollow space on the conductor rail is possible only with a narrow object at the lower clamp opening for the contact wire. The linear, not clearly defined electrical contacts limit current transmission.

SUMMARY OF THE INVENTION

An object of this invention is to improve the known conductor rail joint such that it is easy to assemble, it has a defined current transmission for high electrical currents, it features high mechanical strength at least equal to that of the known conductor rail and it can be detached on demand.

In one aspect, the conductor rail fishplate for joining two adjacent conductor rails consists of two symmetric plates, which overlap the exterior of the conductor rails and which are attached to the conductor rail by a fastener outside a cross-section of the conductor rail, and additionally, spring-loaded contact strips are arranged between the plates and the conductor rail. Therefore, no holes are necessary in the conductor rail. Assembly is easy because the plates are attached to the conductor rail on the outside and overlap the conductor rail. The mechanical strength is achieved by the pre-tensioning of the two plates with screws. The pre-tensioning of the conductor rail fishplates achieves defined point contacts between the fishplate and the conductor rail due to the contact strips. The crosspieces of the conductor rail are not impaired in their elasticity, so that a contact wire pull-in car can also straddle the profile unimpaired. The conductor rail joint can be detached easily from its outside. Also, repeated loosening and tightening is possible without additional means.

BRIEF DESCRIPTION OF THE DRAWINGS

FIG. 1 shows a cross section of a conductor rail having a conductor rail fishplate according to the invention;

FIG. 2 shows a side view of the conductor rail joint and plate of FIG. 1,

FIG. 3b shows a cross section of the contact strip of FIG. 3a.

FIG. 4b shows a cross section of the contact strip of FIG. 4a.

DETAILED DESCRIPTION OF THE PREFERRED EMBODIMENT

Figure 3A:
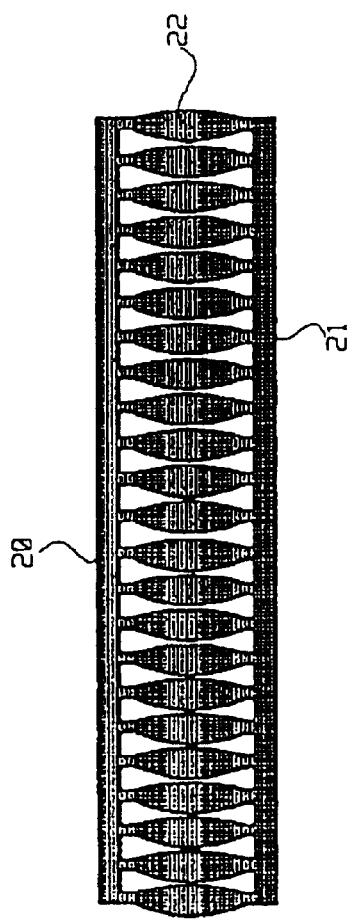
FIG. 3a shows a top view of one embodiment of a contact strip.

FIG. 1 shows a conductor rail 1 holding contact wire 2. Referring to FIGS. 1 and 2, two symmetrical conductor rail fishplate 4 (in the following called "plates"), which are extrusion molded or milled, are attached at a joint (3 in FIG. 2) of two adjacent conductor rails. These plates 4 overlap the exterior of the conductor rail and each have a groove 5, in which a top, horizontal crosspiece 6 of the conductor rail projects. Each plate 4 has a head 7 with a hole 8, a center part 9, and a bottom crosspiece 10, which connects to the center part 9. The mentioned groove 5 is located between the head and center part. The head 7 overlaps the conductor rail 1 almost up to its center 11, while the inside 12 of the center part 9 and the crosspiece 10 pointing towards the conductor rail 1 are shifted outwards and feature a spacing 13 relative to the conductor rail, so that it is possible to widen or bend the conductor rail 1 in order to insert the contact wire 2. The crosspiece 10 is thus shaped like a plate and is used to guarantee the mechanical flexural strength in the longitudinal direction of the conductor rail 1.

The transition region between the groove 5 and the inside 12 is provided with a rounded section 14, which comes into contact with a diagonal section 15 of the conductor rail in the transition region between the horizontal crosspiece 6 and the vertical crosspiece 16 of the conductor rail when the plates are assembled. This provides a linear contact in the contact region. If the two symmetrical plates 4 are tensioned against each other by a fastener (i.e. screw) through the hole 8, then the two plates 4 are not only pushed against each other, but are also pressed with the top, downwards pointing surface 17 of the head 7 against the top side of the conductor rail 1 due to the rounded section 14 in connection with the diagonal section 15. In the surface 17, the two plates each have a recess, in each of which a set of spring-loaded contact strips 18 is inserted. Through the vertical tightening of the plates, the contact strips are pressed with defined force against the conductor rail 1 and the plates 4 over the entire length of the plates, so that a very good multiple contact is produced, which bridges the joint 3.

In the depicted embodiment, the horizontal extent of the groove 5 in the cross section of FIG. 1 is longer than that of crosspiece 6 so that the free ends of the crosspieces do not come into contact with the base of the groove 6. This has the effect that the rounded section 14 in contact with the diagonal section 15 always comes into use.

The section of the center part 9 directed downwards towards the contact wire 2 is provided with a bevel 19. Furthermore, a bevel 20 is formed in the transition region between the center part 9 and the crosspiece 10. Incidentally, all other edges are provided with a rounded section.

The length of the plates in the travel direction depends on the desired mechanical and electrical properties and in practice equals between 200 mm and 400 mm according to current transmission capacity. According to the length and mechanical strength, two to four screws are used. There is a corresponding number of holes a in the head part. For another embodiment, four screws are always used, independent of the length of the plates.

In the side view of FIG. 2, above all the joint 3 between two adjacent conductor rail can be seen, as well as several holes 8. The selected center separating line indicates that the length of the plates can be varied in the travel direction.

Figure 3B:
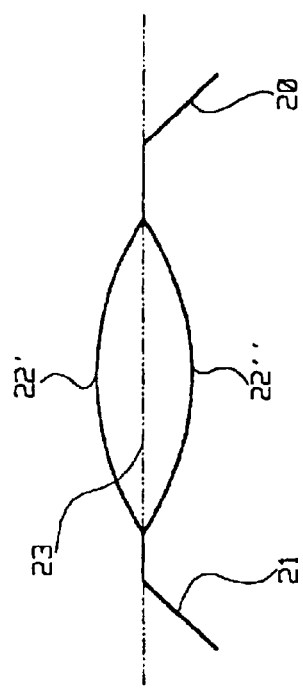
Figure 4A:
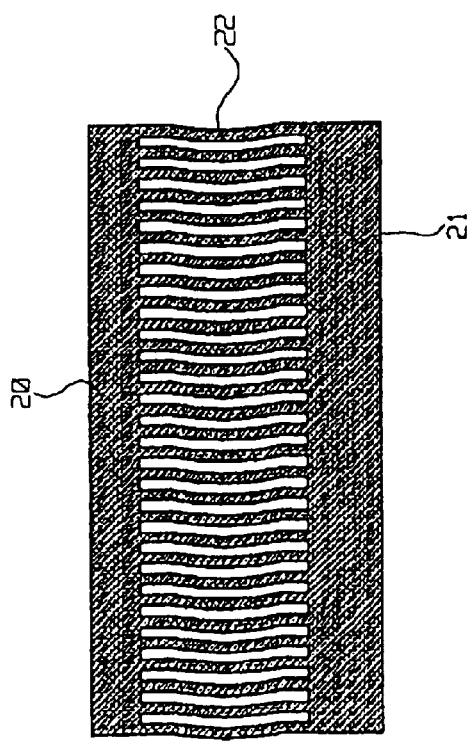
FIG. 4a shows a top view of another embodiment of a contact strip.
Figure 4B:
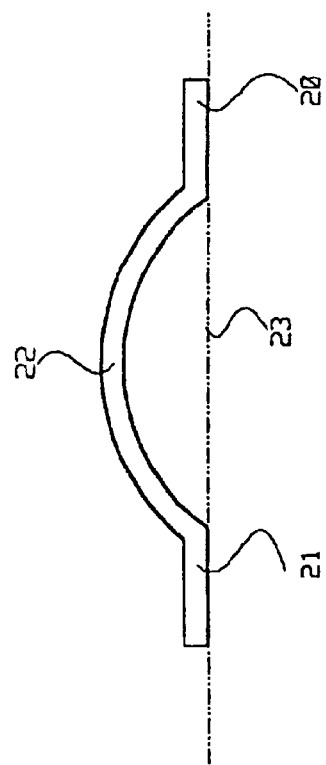
Figure 5:
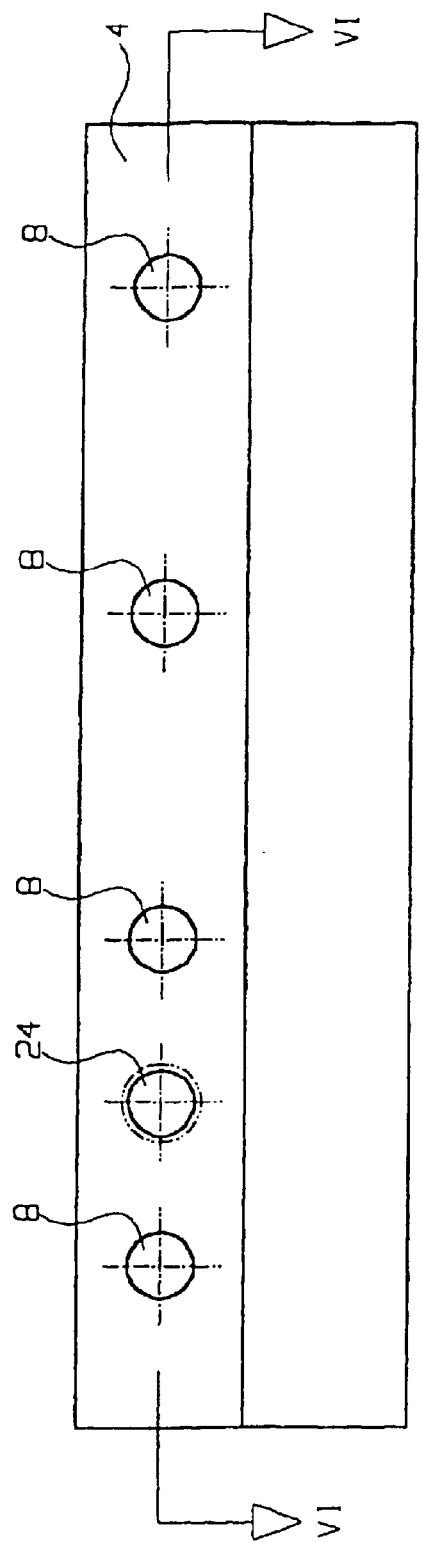
FIG. 5 shows a side view of a conductor rail fishplate.
Figure 6:
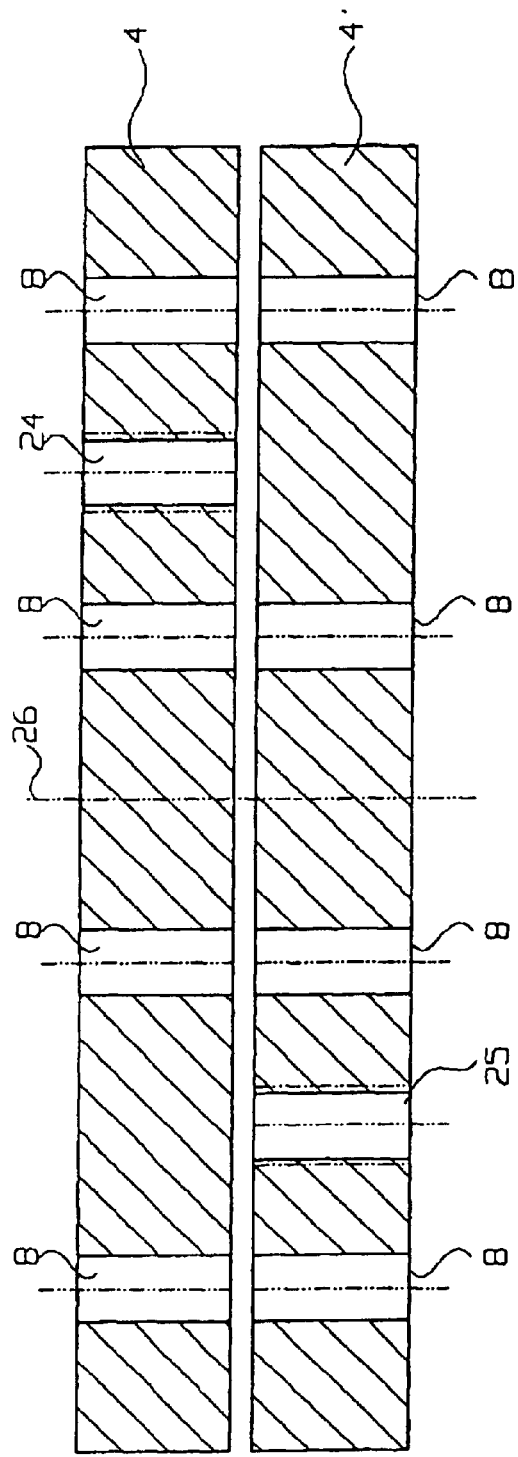
FIG. 6 shows a section along the line VI—VI of FIG. 5.

FIGS. 3 and 4 show two variants of contact strips. FIG. 3a shows a top view and FIG. 3b a schematic cross section. Overall, the contact strips have two parallel connecting pieces 20 and 21, between which there is a plurality of spring contacts 22, which are connected to the two crosspieces 20 and 21. The contacts 22' and 22" curve outwards alternately from a center plane 23. In addition, the two crosspieces 20 and 21 can be bent outwards from this plane 23. If the plates 4 of FIG. 1 and 2 are pressed against the conductor rail, then primarily the contacts 22 and in the case of the bent crosspieces 20 and 21 also the crosspieces come into contact with the conductor rail 1 and the plates 4 and thus form an electrical connection.

FIG. 4 shows another variant, for which the contacts 22 bulge out only to one side like an arc. Obviously, other shapes of contact strips are also possible. However, the essential advantage is that a plurality of contact points are always available and the individual contacts are pressed with defined spring force against the corresponding surfaces, so the desired electrical connection is produced.

In addition to the holes 8, the plates 4 can also have threaded holes 24 or 25, which simplify disassembly. The threaded holes 24 or 25 thus go through only one plate of a pair of opposing plates, so that when screwing in one screw into one of the threaded holes 24 or 25, its front end then supports at the opposing plate and thus the two plates 4 and 4' are pressed apart. The threaded holes 24 and 25 can be symmetric about a centerline 26. Obviously, it would also be possible to form the threaded holes only on one side, i.e., in one plate. The formation in the two opposing plates has the advantage of better accessibility of at least one of the threaded holes in the installed state.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A conductor rail fishplate assembly for joining two adjacent conductor rails comprising:

two plates generally symmetric about a center of the rails and adapted to overlap the exterior of the conductor rails, a fastener adapted to tension the plates against each other and disposed exterior of the conductor rails, and electrical contact strips having a plurality of spring-loaded contacts adapted to be arranged between the plates and the conductor rails, wherein the plates include a groove for engaging one crosspiece of the conductor rail the contact strips being arranged in said grove, wherein the plates further include a head having a hole, a center portion, and a crosspiece connected to said center portion, the crosspiece having a thinner cross-section than the center portion, and the center portion and the crosspiece being spaced from the conductor rail.

2. A conductor rail fishplate as set forth in claim 1 wherein each plate includes a rounded section located between the groove and the center portion, the rounded section being adapted to contact a diagonal section of the conductor rail and to tension the contact strips between the top side of the head when the fastener is tightened.

3. A conductor rail fishplate as set forth in claim 1 wherein the contact strips overlap the joint in the longitudinal direction of the conductor rail and generally extend over the length of the plate.

4. A conductor rail fishplate as set forth in claim 1 further comprising a recess in a bottom side of the head for receiving the contact strips.

5. A conductor rail fishplate as set forth in claim 1 wherein the plates are extrusion molded.

6. A conductor rail fishplate as set forth in claim 1 wherein the plates are milled.

7. A conductor rail fishplate as set forth in claim 1 wherein said fastener is a screw.

8. A conductor rail fishplate assembly for joining two adjacent conductor rails comprising:

two plates generally symmetric about a center of the rails and adapted to overlap the exterior of the conductor rails, a fastener adapted to tension the plates against each other and disposed exterior of the conductor rails, and electrical contact strips having a plurality of spring-loaded contacts adapted to be arranged between the plates and the conductor rails.

wherein a head of at least one of the plates has a threaded hole therethrough.

9. A conductor rail fishplate as set forth in claim 8 wherein the contact strips overlap the joint in the longitudinal direction of the conductor rail and generally extend over the length of the plate.

10. A conductor rail fishplate as set forth in claim 8 wherein the plates are extrusion molded.

11. A conductor rail fishplate as set forth in claim 8 wherein the plates are milled.

12. A conductor rail fishplate as set forth in claim 8 wherein said fastener is a screw.

* * * * *